United States Patent [19]

Vanlautem et al.

[11] 4,182,807
[45] Jan. 8, 1980

[54] PROCESS FOR THE MANUFACTURE OF SALTS OF HYDROXYCARBOXYLATED POLYMERS OF REDUCED MOLECULAR WEIGHT

[75] Inventors: Nöel Vanlautem, Wavre; Julien Mulders, Dworp; Jacques Gilain, Brussels, all of Belgium

[73] Assignee: Solvay & Cie., Brussels, Belgium

[21] Appl. No.: 897,648

[22] Filed: Apr. 18, 1978

[30] Foreign Application Priority Data

Apr. 25, 1977 [LU] Luxembourg .......................... 77196

[51] Int. Cl.² .......................... C08F 8/06; C08F 8/44; C08F 8/50
[52] U.S. Cl. .................................... 525/387; 525/367
[58] Field of Search .......................... 528/914; 526/57

[56] References Cited

U.S. PATENT DOCUMENTS

| | | | |
|---|---|---|---|
| 3,110,708 | 11/1963 | Wisseroth et al. | 526/914 |
| 3,232,918 | 2/1966 | Rayner | 526/914 |
| 3,313,793 | 4/1967 | De La Mare | 526/914 |
| 3,637,609 | 1/1972 | Blumberg et al. | 260/78.4 R |
| 3,691,139 | 9/1972 | Blumberg et al. | 526/57 |
| 3,957,737 | 5/1976 | Pautrat et al. | 526/914 |
| 4,074,033 | 2/1978 | Wolinski et al. | 526/914 |

FOREIGN PATENT DOCUMENTS 883804 12/1961 United Kingdom .

*Primary Examiner*—William F. Hamrock
*Attorney, Agent, or Firm*—Spencer & Kaye

[57] ABSTRACT

Process for the manufacture of salts of hydroxycarboxylated polymers of reduced molecular weight, starting from the corresponding polymer salts of higher molecular weight, comprises reacting the polymer salt of higher molecular weight with an oxidizing agent in the presence of a solvent.

11 Claims, No Drawings

PROCESS FOR THE MANUFACTURE OF SALTS OF HYDROXYCARBOXYLATED POLYMERS OF REDUCED MOLECULAR WEIGHT

BACKGROUND OF THE INVENTION

The present invention relates to a process for the manufacture of salts of hydroxycarboxylated polymers of reduced molecular weight. The products thus obtained can be used as active adjuvants (sequestering agent or "builder") in detergent compositions.

Processes are known for the depolymerization in solution of polymers such as polyethylene and polypropylene, using oxidizing agents. See British Pat. No. 883,804. These processes have the disadvantages that they are accompanied by a degradative oxidation of all or part of the polymer, which leads to the formation of colored products and necessitates subsequent bleaching treatments, and that they produce inconvenient by-products arising from the oxidation of the solvent.

In the manufacture of salts of non-hydroxylic carboxylic acid polymers of reduced molecular weight, it is known to neutralize the corresponding polycarboxylic acid which already has a low molecular weight. See U.S. Pat. No. 3,637,609 which concerns the fabrication of sodium polymaleate by neutralization of polymaleic acid.

These processes result in large losses of products. In addition, they require numerous reaction steps. Finally, they do not generally make it possible to obtain perfectly white products without a subsequent bleaching operation. Thus, in U.S. Pat. No. 3,637,609, the sodium polymaleate salt obtained by the neutralization is in the form of finely divided pale yellow particles which are then bleached with a bleaching agent such as hydrogen peroxide, peracetic acid, sodium hypochlorite, perbenzoic acid or ozone.

SUMMARY OF THE PRESENT INVENTION

There has now been found, in accordance with the present invention, a process which makes it possible to depolymerize salts of hydroxycarboxylated polymers, which process does not exhibit the above-mentioned disadvantages and makes it possible to obtain salts of hydroxycarboxylated polymers, which have an identical chemical nature to that of the starting polymer salts and a reduced molecular weight, and which are white in color.

The present invention provides a process for the manufacture of salts of hydroxycarboxylated polymers of reduced molecular weight, starting from the corresponding polymer salts of higher molecular weight, in which process the polymer salt of higher molecular weight is reacted with an oxidizing agent in the presence of a solvent.

It is to be understood that both the foregoing general description and the following detailed description are exemplary, but are not restrictive of the invention.

DETAILED DESCRIPTION OF THE INVENTION

The polymer salts manufactured according to the present invention are generally alkali metal or ammonium salts.

The process of the present invention is applied to the depolymerization of various types of salts of hydroxycarboxylated polymers. The polyhydroxycarboxylates described in German patent application No. 1,904,940, filed on Feb. 1, 1969, in the name of DEGUSSA, may be indicated as examples of such polymers.

Particularly suitable salts of hydroxycarboxylated polymers are those which contain monomeric units of the formula:

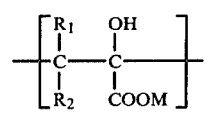

in which $R_1$ and $R_2$ represents hydrogen or an alkyl group containing from 1 to 3 carbon atoms which can be substituted by a hydroxyl group or by a halogen atom, it being possible for $R_1$ and $R_2$ to be identical or different, and in which M represents an alkali metal atom or an ammonium group. M most frequently represents a sodium or potassium atom or an ammonium group. M preferably represents the sodium atom.

The polymers which can be used according to the invention are preferably those polymers as defined above in which $R_1$ and $R_2$ represent hydrogen or a methyl group, it being possible for $R_1$ and $R_2$ to be identical or different. The best results are obtained with polymers in which $R_1$ and $R_2$ represent hydrogen.

The polymers used in the present invention are selected from among homopolymers and copolymers containing units as defined above in formula I, which are of the same type or of several different types. Thus, the polymers are either homopolymers only containing monomeric units of formula I; or copolymers containing: (a) nothing but comonomers of formula I, but different by the nature of $R_1$, $R_2$ and/or M; or (b) monomers of formula I copolymerized with another monomer, such as a monomer which can advantageously be substituted by carboxyl or hydroxyl groups. When copolymers are used, they are most frequently selected from among those which contain at least 20% of units as defined above in formula I, and, preferably, from among those which contain at least 50% of such units. The best results are obtained with polymers which only contain units as defined above in formula I.

Those copolymers which contain units derived from vinyl monomers, which are substituted by groups selected from among hydroxyl and carboxyl groups, are included among the copolymers which can be used. These copolymers advantageously contain acrylic units of the formula:

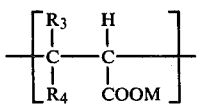

in which $R_3$ and $R_4$ represent a hydrogen atom or an alkyl group containing from 1 to 3 carbon atoms, and in which M has the same meaning as above. Among these copolymers those containing acrylic units derived from unsubstituted acrylic acid, in which $R_3$ and $R_4$ represent hydrogen, are preferably used.

A particularly suitable polymer is sodium poly-alpha-hydroxyacrylate.

The average molecular weight of the starting polymers is of course greater than that of the polymer which it is desired to obtain. In other respects, the molecular weight is not in itself critical and starting polymers of very diverse molecular weights can be used. The choice of the molecular weight of the starting polymer is bound up with the availability of this material. A polymer having a molecular weight which is not too much greater than that of the polymer which it is desired to obtain is preferably used as the starting polymer, so that the reaction does not have to be carried out for too long a time. Polymers having average molecular weights greater than about 3,000 are generally used as the starting polymers. In general, their average molecular weight is between 5,000 and 1,000,000. The best results are obtained when it is between about 10,000 and 800,000.

The average molecular weights ($M_F$) mentioned above are determined in accordance with the FLORY relationship which results from combined ultracentrifugation and intrinsic viscosity measurements (L. Manderkern and P. J. Flory, *Journal of Chem. Physics,* 1952, 20, pages 212–214).

The starting polymers used according to the present invention can be prepared by any known process and, for example, by that described in Belgian Pat. No. 817,678, filed on July 15, 1974, in the name of Solvay & Cie.

The solvent medium in which the depolymerization is carried out can be of any type, provided that it dissolves the salts of the hydroxycarboxylated polymers manufactured according to the process of the present invention as well as the starting polymer, and provided that it is inert towards the oxidizing agent in the operating conditions. It can be formed from a single solvent or from a mixture of several solvents. The depolymerization is most frequently carried out in a solvent medium containing water in order to prevent the formation of by-products from the oxidation of the solvent. The preferred solvent essentially contains water. The solutions of the starting polymer generally contain from 0.1 to 50%, and preferably between 1 and 30%, by weight of polymers. However, other concentrations can also be suitable.

The oxidizing agents used for the depolymerization are conventional oxidizing agents. They generally comprise agents which easily liberate oxygen in atomic form. A single oxidizing agent or a mixture of oxidizing agents can be used. Hydrogen hypochlorite or sodium hypochlorite and hydrogen peroxide are the oxidizing agents which are generally used. The preferred oxidizing agent is hydrogen peroxide.

The oxidizing agent can be present in the oxidizing medium in any amount. Generally, an amount is employed which is such that the oxidizing agent is completely consumed at the end of the depolymerization operation. Concentrations of 0.01% to 30% of the weight of the solution are very suitable.

The aqueous solutions of the starting polymers are preferably of a basic nature. This means that the pH of the solutions is preferably greater than 7 when aqueous solutions are used. The reaction is most frequently carried out at pH values of between 8 and 12 depending on the concentration.

The depolymerization according to the present invention can be carried out, for example, at between 10° C. and the boiling point of the reaction medium at the reaction pressure. The reaction is generally carried out at between 30° C. and 120° C. The reaction is preferably carried out at the boiling point of the reaction medium.

The depolymerization according to the present invention can be carried out at any pressure. It is advantageously carried out at absolute pressures of between 0.001 and 5 kg/cm². The reaction is generally carried out at pressures of between 0.01 and 3 kg/cm².

The duration of the depolymerization treatment is chosen according to the exact nature of the starting hydroxycarboxylated polymer, and more particularly its starting average molecular weight, and according to the operating temperature, the average molecular weight which it is desired to obtain and the concentration of oxidizing agent. The depolymerization generally takes between 5 minutes and 24 hours, and most frequently between 15 minutes and 15 hours. The reaction is preferably carried out with operating times of between 30 minutes and 10 hours.

The polymers obtained according to the present invention have a molecular weight which depends, in particular, on the depolymerization time and on the concentration of oxidizing agent. A long contact time and a high concentration of oxidizing agent favor, independently of one another, the production of low molecular weight polymers. Another factor which influences the molecular weight of the final product is the molecular weight of the starting polymer. However, using the same starting polymer, it is possible to obtain polymers of very variable molecular weights, depending on the treatment conditions. The ratio of the molecular weight of the starting polymer to that of the final polymer is generally between 1.2 and 100. Ratios of between 1.5 and 20 are easily obtained. The molecular weights obtained by depolymerization are very variable, but they are frequently between 500 and 200,000, and generally between 2,000 and 100,000.

The polymer of reduced molecular weight, obtained according to the present invention, can be used as it is, or it can be subjected to subsequent treatments, such as, for example, granulation treatments, depending on whether it is desired to modify certain of its mechanical properties.

The depolymerization according to the present invention can be carried out in any installation which makes it possible to combine the conditions of temperature, pressure and surrounding medium which are necessary for the operation. Thus, it does not matter whether the reaction is carried out in reactors, round-bottomed flasks, autoclaves or the like. The chemical nature of the materials constituting these apparatus is not critical. The depolymerization can be carried out continuously or discontinuously.

The process according to the present invention possesses a remarkable efficiency. In fact, the process makes it possible to obtain hydroxycarboxylated homo- or co-polymers of reduced molecular weight, without loss of product by oxidation or by uncontrolled decomposition. Furthermore, it makes it possible to obtain products having an improved whiteness relative to the starting polymer. For the class of polymers in question, it becomes possible, by means of the process of the present invention, to obtain a whole range of products having various molecular weights, by only carrying out a single polymerization. The product resulting from the polymerization can be stored and is available, at any time, to give the polymer of desired molecular weight, by depolymerization, without substantial loss of product.

Furthermore, the process of the present invention exhibits the advantage that it can be carried out at any time after the formation of the starting polymer salts. Thus, it can be applied directly to the aqueous solutions obtained on neutralizing the polyhydroxyacrylic acids, without intermediate separations being necessary.

The polymers obtained according to the present invention can be used for various applications, and especially as active adjuvants (sequestering agents or "builders") in detergent compositions, and as agents for dispersing organic and inorganic molecules.

The example which follows is in no way limiting and is given in order to show the remarkable results obtained in accordance with the process of the invention.

EXAMPLE 50 g of sodium poly-alpha-hydroxyacrylate are introduced into a 1 liter round-bottomed flask and are dissolved in 500 ml of water. The solution obtained is heated under reflux at a temperature of 102° C. and a 30% strength solution of hydrogen peroxide in water is added all at once. The molar ratio of the amount of hydrogen peroxide introduced to the sodium alpha-hydroxyacrylate units of the polymer is given in the table below. The end of the operation is indicated by the complete disappearance of the hydrogen peroxide from the solution.

The final solution is then evaporated at 80° C. under a pressure of 20 mm of mercury, until the weight of polymer remains constant.

The table shows the change in the molecular weight as a function of the duration of the treatment and of the ratio of hydrogen peroxide/sodium alpha-hydroxyacrylate units.

Examination of the product IR, which has not been subjected to depolymerization in accordance with the process of the invention, is given by way of comparison. The products 2, 3 and 4 were depolymerized in accordance with the process of the invention.

TABLE

| Product | Total duration of the treatment in hours | Molar ratio of H$_2$O$_2$/alpha-hydroxy-acrylate units | Molecular weight by the Flory method $\times 10^{-3}$ | Color of the product |
|---|---|---|---|---|
| 1R | 0.00 | 0.00 | 120 | yellow |
| 2 | 2.25 | 0.09 | 27 | white |
| 3 | 3.75 | 0.19 | 8 | white |
| 4 | 5.50 | 0.37 | 3.6 | white |

Examination of the results shows that, in a relatively short period of time, it is possible to obtain polymers of a very small molecular weight relative to the molecular weight of the starting product.

Furthermore, examination of the results also shows that polymers which are perfectly white in color can be obtained from a yellow-colored starting polymer, which is of capital importance in the field of the active adjuvants (sequestering agents or "builders") which can be used in detergent compositions.

It will be understood that the above description of the present invention is susceptible to various modifications, changes and adaptations, and the same are intended to be comprehended within the meaning and range of equivalents of the appended claims.

What is claimed is:

1. Process for the manufacture of a salt of a hydroxycarboxylated polymer of reduced molecular weight, starting from a corresponding polymer salt of higher molecular weight, said hydroxycarboxylated polymer contains monomeric units of the formula:

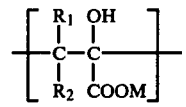

in which $R_1$ and $R_2$ represent hydrogen or an alkyl group containing from 1 to 3 carbon atoms which can be substituted by a hydroxyl group or by a halogen atom, $R_1$ and $R_2$ being identical or different, and in which M represents an alkali metal atom or an ammonium group, said process comprising: reacting the polymer salt of higher molecular weight with an oxidizing agent in the presence of a solvent.

2. Process according to claim 1, wherein M represents the sodium atom.

3. Process according to claim 1, wherein the hydroxycarboxylated polymer is a homopolymer.

4. Process according to claim 3, wherein the hydroxycarboxylated polymer is sodium poly-alpha-hydroxyacrylate.

5. Process according to claim 1, wherein the solvent is water.

6. Process according to claim 1, wherein the oxidizing agent is hydrogen peroxide.

7. Process according to claim 1, wherein the reacting is carried out at a temperature which is between 10° C. and the boiling point of the reaction medium at the reaction pressure.

8. Process according to claim 7, wherein the reacting is carried out at a temperature of between 30° and 120° C.

9. Process according to claim 7, wherein the reaction pressure is between 0.01 and 3 kg/cm$^2$.

10. Process according to claim 1, wherein the reaction takes between 15 minutes and 15 hours.

11. Process according to claim 1, wherein the average molecular weight of the starting polymer is between 10,000 and 800,000.

* * * * *